March 21, 1967  J. S. SENEY  3,310,719
ENCAPSULATED ELECTRICAL COMPONENT
Filed March 1, 1966
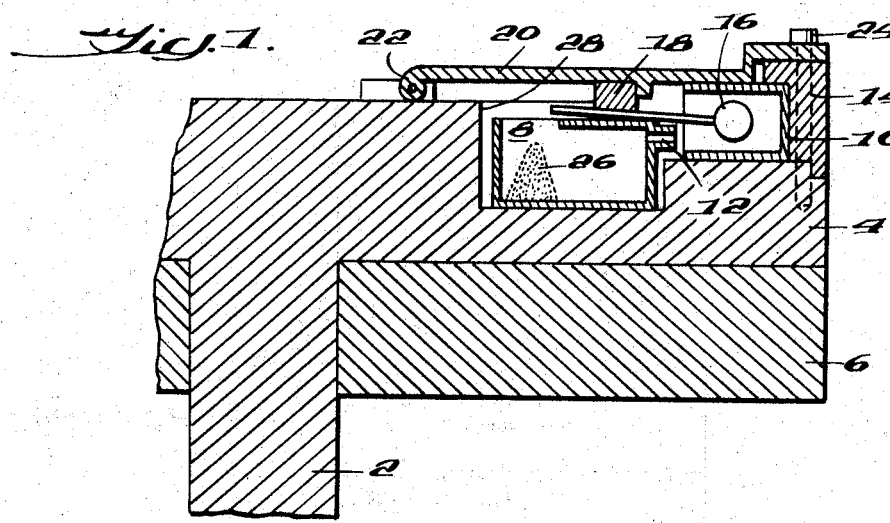
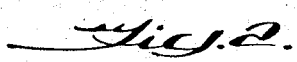
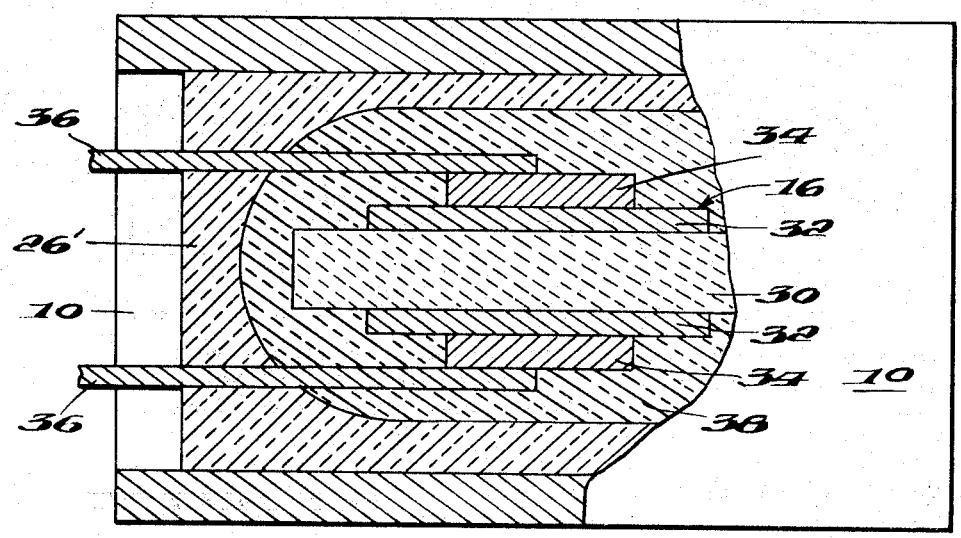

United States Patent Office 3,310,719
Patented Mar. 21, 1967

3,310,719
ENCAPSULATED ELECTRICAL COMPONENT
John Seymour Seney, Seaford, Del., assignor to E. I. du Pont de Nemours and Company, Wilmington, Del., a corporation of Delaware
Filed Mar. 1, 1966, Ser. No. 530,817
3 Claims. (Cl. 317—258)

This application is a continuation-in-part directed to subject matter divided from copending application Serial No. 117,082, filed June 14, 1961 now U.S. Patent 3,251,-918. The invention relates to encapsulated electrical components.

Oftentimes, electrical components and particularly capacitors are used without being encapsulated or potted. Although the need for various forms of protection has existed, it appears that only low-temperature materials, such as wax, etc., have been used for such items. Recently, a requirement has arisen for electrical components and, in particular, capacitor elements, capable of operating at elevated temperatures and under high accelerating forces. Ceramic capacitors have been developed for this; however, the normal materials for making the electrical connections to capacitors have not been found satisfactory in operation at the high temperatures, probably because of oxidation. The most satisfactory material that has been found for the condenser or capacitor plates is silver. The capacitor element consists generally of the silver plates supported on a ceramic material and provided with suitable connections for lead wires. High temperatures have deleterious effects on the silver plates and cause rapid oxidation thereof. Therefore, they need to be protected.

Another difficulty encountered in operating electrical components and capacitors at elevated temperatures is that capacitance characteristics do not remain stable when subjected to a radical change in temperature. This is believed to be related to the change in geometry and dimensions caused by changes in the temperature. In many instances, their characteristics change so much that they become useless.

It is obvious for a capacitor element to operate at an elevated temperature that any encapsulating material must be capable of suitably withstanding this high temperature. In most instances, the encapsulating material becomes fluid at temperatures higher than the operating temperature. It has been found that under normal potting or encapsulating techniques the silver plates oxidize rapidly while bringing the capacitor up to the temperature for encapsulation. This is undesirable and it has been necessary to develop a method to overcome this undesirable situation.

Previously, in many encapsulation techniques, the encapsulating material was simply poured into the mold and surrounded the device to be encapsulated. This permitted bubbles and air pockets to form. In most low-temperature applications this condition was not too damaging, but it cannot be tolerated with units intended for use in high temperature environments.

In accordance with the present invention, the above and other difficulties have been avoided by providing a capacitor of the type described with both a glazed, air tight coating of a devitrified glass material and a dense, homogeneous encapsulation of the same material.

Various objectives and advantages will appear from a consideration of the following specification and the accompanying drawing in which:

FIGURE 1 is a partial longitudinal cross section through one version of centrifugal apparatus used to encapsulate capacitors; and FIG. 2 is an enlarged sectional view through a capacitor encapsulated in accordance with the present invention.

As shown in FIG. 1, the apparatus for centrifugally encapsulating capacitors includes a drive shaft 2 driven by an appropriate motor and speed control unit (not shown). Mounted on the drive shaft 2 is a cylindrical main block member 4 and an annular heater block member 6 fitted thereto. Suitably mounted in the heater block member 6 are electrical heaters of conventional design, such as Cal-rod heaters (not shown) which may have electrical connections through rotary slip rings (not shown). Temperature is controlled in any desirable manner such as by a thermocouple mounted on the rotating members and connected to a controller unit through the slip rings. Main block member 4 is provided with a number of circumferentially spaced radially disposed cut-out portions, one of which has been designated at 28. Each cut-out portion is constructed and arranged to receive a reservoir or container 8 for powdered encapsulating material and a mold unit or can 10 in which the component to be encapsulated is positioned. Reservoir 8 is provided with a conduit section or nozzle 12 leading into the mold unit 10. A locating and securing ring 14 is used to position and partially clamp the mold units 10 and reservoirs 8 in position in the main block. A capacitor element 16 is positioned in the mold unit 10 by its lead wires which are threaded through an assembly block or positioning element 18. Clamp members 20, hinged at points 22, are swingable into engagement with ring 14 to clamp assembly blocks 18, reservoirs 8 and mold units 10 firmly in position. Clamp ring 14 and clamp members 20 are secured to the main block member 4 by a plurality of bolts 24. Clamp members 20 and reservoirs 8 are provided with suitable openings so that a measured amount 26 of molding powder can be deposited in each reservoir.

According to the present invention, the capacitor elements are precoated and glazed so that during the heating of the elements prior to encapsulation, the silver plates are not oxidized or otherwise deleteriously affected. The first treatment consists of coating each element 16 with a suitable solution or slurry of the final encapsulating material, letting it air dry and then drying it in an oven to drive off the solvent or slurry vehicle.

The second treatment is to dip the precoated capacitor element into an atmosphere at a sufficiently high temperature for a time interval to cause the coating to flow and glaze. In this carefully controlled time interval, which is very short, the silver plates do not have a chance to oxidize before the precoating is glazed.

The third treatment is to mount the glazed capacitor element in an apparatus of the type shown in FIG. 1 and described above. The main block is preheated to a temperature above the melting temperature of the powdered encapsulating material. The glazed capacitor elements 16, mold units 10, reservoirs 8, etc., are allowed to soak at the elevated temperature in the apparatus for sufficient time to bring these units up to the desired operating temperature by which time the glazed coating 38 has devitrified. Upon reaching the elevated temperature, the premeasured amount of powdered encapsulating material 26 is rapidly supplied to the reservoirs 8 and the apparatus secured in the operating position by bolts 24. The powder comes up to its melting temperature very rapidly, while the centrifugal apparatus is accelerating to the desired rotary speed. When the powder comes up to temperature, it becomes liquid in form but remains in this form for only a short time. After this extremely short time, the encapsulating material solidifies. Due to centrifugal force on the rotated parts, the liquid encapsulating material is directed through nozzle 12 into can 10 where it surrounds element 16 in a dense, homogeneous, complete encapsulation 26', free from air bubbles, voids or cracks. Since it solidifies after a short time, the temperature is not usually reduced and the unit can be removed almost immediately; that is, mold unit 10 containing the encapsulated capacitor element can be removed while hot, cooled outside the test fixture, and then the encapsulated element removed from the mold unit, if desired.

Referring to FIG. 2, capacitor 16 has a ceramic dielectric disc 30 on which a pair of silver capacitor plates 32 have been fired. Electrical connections in the form of silver discs 34 are attached to plates 32 by sintering with a powdered silver paste. Beforehand, nickel leads 36 had been spot welded to discs 34. The air tight, glazed coating of devitrified glass which is applied before encapsulation has been designated by numeral 38. Encapsulation layer 26' is contained by nickel can 10.

As noted, the liquid material surrounds element 16 and solidifies as a dense, homogeneous, complete encapsulation 26', free from air bubbles, voids or cracks. If present, the latter would admit free oxygen which would oxidize plates 32 in spots and leave such spots nonconductive, thereby changing the plate-to-dielectric contact area and affecting capacitance directly.

Example I

Barium-titanate, 0.004 mfd., 1,000 volt disc-type capacitors 16 may be obtained commercially, with 0.005 inch thick, ¼ inch diameter silver discs 34 attached to the previously fired-on silver capacitor plates 32 by sintering with a powdered silver paste. The discs have spot-welded nickel leads 36 attached thereto prior to sintering.

Such capacitors are given a preliminary coating by dipping into a slurry of Pyroceram No. 95-No. 2 cement (a devitrifiable glass powder marketed by Corning Glass Works and described by Claypoole in U.S. 2,889,952) and amyl acetate, ratio of mixture 8.05 to 1 by weight. The capacitors are then air dried at room temperature for three hours, redipped and again air dried for three hours at room temperature. They are then baked for twenty-four hours at 100° C. Next, they are inserted into a vertical muffle furnace set at 632° C., where the heated capacitor can be closely observed. Upon the observation of glazing, the capacitor is removed and allowed to air cool at room temperature. The glazing heat cycle usually requires approximately one minute. The capacitors are then ready for final encapsulation.

Final encapsulation is carried out as described above, with the apparatus at a temperature of 450° C. Capacitor preheat time in the centrifuge is five minutes. Spinning time after insertion of the devitrifiable glass powder is five minutes at 1,000 r.p.m. and is followed by rapid removal of the capacitor from the heated apparatus. The capacitor is allowed to cool in room air after removal from the apparatus.

It was discovered from a number of measurements that this encapsulation method not only increases the capacitance but also improves the stability of the capacitor elements. For example, the bare capacitor as received had an average capacitance of 0.00407 mfd. After glazing, the capacitance had increased about 1.6% to 0.004136; after encapsulation, the capacitance had increased to 0.00446 mfd., an increase of almost 10 percent. Placement of a bare, unglazed capacitor in the apparatus for a five minute heat soak caused a capacitance decrease of about 3.5%.

Frequently, these capacitors are used (U.S. 3,112,070) where the temperature is maintained at an elevated point during normal operating conditions; but at a shut-down, the temperature is allowed to reduce considerably. Upon start-up, the temperature is again returned to its elevated point. Capacitors, as mentioned in Example I above, purchased and received from the commercial manufacturer (and in addition, encapsulated according to conventional practice), have not been sufficiently temperature stable, while the similar units, after encapsulation accordnig to this invention, are stabilized to significantly increased degree as indicated in the following.

Example II

A test for stability consisted of mounting a number of capacitors in a temperature-controlled block. The temperature was increased from 50° C. to 200° C. in approximately twenty minutes. It was then reduced back to 50° C. in approximately five minutes. The cycle was repeated a number of times with capacitor elements encapsulated according to conventional practice and with capacitor elements encapsulated according to this invention. Twenty of the latter were all functioning and still stable after 3,000 cycles when test was discontinued. Most of the conventionally encapsulated capacitors failed after 2-10 cycles. A rare unit survived as many as 300 cycles.

The following is given as a possible explanation of the mechanism whereby the encapsulation process of this invention increases the capacitance and temperature stability of a capacitance element. During encapsulation by the present process, the capacitor is subjected to high compressive forces. As the encapsulation material solidifies, these compressive forces are maintained and, in fact, may be increased due to shrinkage of the material. It is believed that these combined forces are in effect "locked-in," compressing the dielectric between the capacitor plates, to increase the capacitance of the element.

The increased temperature stability results from the fact that the locked-in compressive forces, acting on the unit, change only an insignificant amount when the temperature changes, as compared with a conventionally encapsulated unit which having no external forces is free to expand and contract with temperature changes. The effect bubbles would have on plates 32 has already been noted. Any bubbles in encapsulation 26' would also cause nonsymmetrical stresses, leading to varying shrinkage pressures and patterns on the dielectric disc 30. Such effects would produce nonuniformities in the dynamic characteristic curves of the capacitor during heating and cooling cycles.

After cooling, the encapsulated capacitor can either be removed from or left in can 10. In either event, it can easily be mounted into other equipment and mechanical mounting pressure applied without adversely affecting the electrical characteristics.

While the foregoing description has emphasized encapsulating capacitor elements, the same technique can be used with other electrical devices, components and assemblies. Obviously, the technique is also useful with capacitors having characteristics and structural arrangements differing from those which have been illustrated and exemplified. Other modifications and adaptations of the presently disclosed subject matter will occur to those skilled in the art without departing from the spirit of the invention which accordingly is intended to be limited only by the scope of the appended claims.

Having thus described the invention, what is claimed as new and desired to be secured by Letters Patent is:

1. An improved heat and acceleration stabilized encapsulated electrical capacitance element, said element comprising spaced metallic capacitor plates separated by a dielectric composition and electrical lead connections operatively associated with said plates, said element having a glazed, air tight coating of devitrified glass material, said coating in turn being surrounded by a unitary dense homogeneous mass of the same material, said mass of material having shrinkage characteristics during its transition from liquid to solidified conditions, said plates and composition being under a uniform compressive force as a consequence of their encapsulation in said mass, the characteristics of said material and level of the compressive force so controlled that the encapsulated plates and composition are acted upon by said material to oppose relative movement due to acceleration forces exerted on said element or thermal expansion under the effects of elevated temperatures.

2. An electrical component having metallic parts and lead wires, the improvement of which comprises a glazed air tight coating of devitrified glass material covering the exposed surfaces of said parts and a dense, homogeneous mass of the same material surrounding said coating as an encapsulation, said material having shrinkage characteristics during its transition to the solid state, said parts being under a uniform compressive force as a consequence of their encapsulation in said mass.

3. The component of claim 2 wherein said parts include a spaced pair of silver capacitor plates and wherein is provided a ceramic dielectric disc sandwiched between said plates.

References Cited by the Examiner

UNITED STATES PATENTS

| 2,972,180 | 2/1961 | Gulton | 317—261 X |
| 3,110,619 | 11/1963 | Koenig | 117—215 |

LEWIS H. MYERS, *Primary Examiner.*

E. GOLDBERG, *Assistant Examiner.*